(12) United States Patent
Morano et al.

(10) Patent No.: US 8,603,240 B2
(45) Date of Patent: Dec. 10, 2013

(54) CONVERTING COAL ASH AND ELECTRIC ARC FURNACE DUST INTO GLASS-CERAMIC MATERIALS

(76) Inventors: James Morano, Hallandale, FL (US); John Buddemeyer, Salisbury, NC (US)

( * ) Notice: Subject to any disclaimer, the term of this patent is extended or adjusted under 35 U.S.C. 154(b) by 0 days.

(21) Appl. No.: 13/704,041

(22) PCT Filed: Jun. 21, 2011

(86) PCT No.: PCT/US2011/041244
§ 371 (c)(1),
(2), (4) Date: Dec. 13, 2012

(87) PCT Pub. No.: WO2011/163224
PCT Pub. Date: Dec. 29, 2011

(65) Prior Publication Data
US 2013/0097942 A1 Apr. 25, 2013

Related U.S. Application Data

(60) Provisional application No. 61/357,393, filed on Jun. 22, 2010.

(51) Int. Cl.
*C04B 18/06* (2006.01)
*C04B 18/08* (2006.01)
*F23B 99/00* (2006.01)

(52) U.S. Cl.
USPC .............. 106/707; 106/705; 110/342; 241/23

(58) Field of Classification Search
USPC ....................... 106/705, 707; 110/342; 241/23
See application file for complete search history.

(56) References Cited

U.S. PATENT DOCUMENTS

| | | | | | |
|---|---|---|---|---|---|
| 5,022,897 | A | * | 6/1991 | Balcar et al. | 95/279 |
| 5,114,122 | A | * | 5/1992 | Hnat | 266/186 |
| 5,180,421 | A | * | 1/1993 | Rostoker et al. | 75/414 |
| 5,273,566 | A | * | 12/1993 | Balcar et al. | 65/17.1 |
| 5,462,570 | A | * | 10/1995 | Balcar et al. | 65/17.1 |
| 5,830,251 | A | * | 11/1998 | Simpson et al. | 65/17.3 |
| 5,935,885 | A | * | 8/1999 | Hnat et al. | 501/1 |
| 5,964,911 | A | * | 10/1999 | Morano et al. | 65/19 |
| 6,057,257 | A | * | 5/2000 | Morano et al. | 501/53 |
| 6,342,461 | B1 | * | 1/2002 | Lee et al. | 501/141 |
| 2006/0070406 | A1 | * | 4/2006 | Raichel et al. | 65/134.8 |

* cited by examiner

*Primary Examiner* — Anthony J Green
(74) *Attorney, Agent, or Firm* — Porter Wright Morris & Arthur, LLP.

(57) ABSTRACT

A process for control melting a mixture of coal ash, electric arc furnace dust, recycled glass and additives to create a feedstock. The feedstock is quenched or air dried in a mold to create useful products, such as fracking compounds, abrasives, construction products, building materials, landscaping materials, and the like.

22 Claims, 3 Drawing Sheets

CONVERTING COAL ASH AND ELECTRIC ARC FURNACE DUST INTO GLASS-CERAMIC MATERIALS

CROSS-REFERENCES TO RELATED APPLICATIONS

This patent application claims the benefit of provisional patent application Ser. No. 61/357,393, filed Jun. 22, 2010, hereby incorporated by reference.

FIELD OF THE INVENTION

The invention relates generally to the processing of a combination of coal ash and electric arc furnace dust to produce a feedstock used for manufacturing commercially useful products such as glass-ceramic products.

BACKGROUND OF THE INVENTION

Hazardous and solid wastes containing heavy metal contaminants are a major environmental issue. Many of these wastes are in landfills that are potentially leaching heavy metals into water supplies. Attempts have been made to protect the environment from contamination, but many of these attempts are expensive or do not adequately prevent the heavy metal contaminants from leaching into the environment.

Coal ash, including coal combustion products (CCPs) and coal combustion residue (CCRs), and electric arc furnace dust (EAFD) present major waste problems in the US and other industrialized nations. Both have been shown to contain heavy metals (lead, mercury, iron, copper, manganese, cadmium, arsenic, nickel, aluminum, silver, and beryllium) and light metals and halides (sodium, lithium, sulfur, chloride, etc.) that are or can be hazardous if not handled properly.

Coal Ash is solid wastes generated during the burning of coal in power plants. Coal Ash includes fly ash, bottom ash, boiler slag, grit, flue gas desulfurization material and other wastes, such as fluidized bed combustion ash, cenospheres, and scrubber residues. Of the Coal Ash produced from burning coal for power generation, over 80% ends up as fly ash with much of the remainder being bottom ash. Coal Ash contains organic carbon materials (through loss on ignition) and metal contaminants, such as arsenic, boron, cadmium, chromium, copper, lead, selenium, zinc and the like.

EAFD is a byproduct of the melting of metals in an electric arc furnace to make carbon steel. EAFD forms as a result of the molten metal being oxidized and cooled. Over 2% of the scrap feed melted to produce carbon steel ends up as EAFD. EAFD contains free and composite oxides. The composite oxides include magnesium, iron, nickel, manganese, zinc, copper, chromium, cadmium, lead and/or chlorides. EAFD is classified by the U.S. Environmental Protection Agency as a K061 hazardous waste because it fails that agency's toxicity characteristic leaching procedure test for lead, cadmium and chromium.

Currently, Coal Ash are not classified as hazardous waste. Most Coal Ash is disposed of in landfills or ash ponds, but some are recycled. Fly ash, for example, is used extensively in concrete and soil stabilization. The chemical makeup of Coal Ash depends on the compounds in the burned coal, but most contain amounts of silicon dioxide ($SiO_2$) and calcium oxide (CaO). Fly ash is classified as Class F or Class C depending upon the amount of calcium, silica, alumina, and iron content in the ash. Class F fly ash requires an activator and is used in Portland cement. Class C fly ash is self-cementing and does not require a chemical reagent or activator.

Disposing of EAFD is more complicated due to the hazardous waste classification. Currently, some EAFD is sent to a landfill, but most is treated by fixing the metal in a solid or processing at high temperatures or another electric or hydrometallurgical process to separate the metals out of the dust. However, current methods of processing EAFD are expensive and may be ineffective or hazardous themselves.

Abrasives are compounds used to shape, smooth and polish other materials. Abrasives are also used to remove a substance (such as paint) from a surface. Common uses for abrasives include grinding, polishing, buffing, honing, cutting, drilling, sharpening, lapping, and sanding. Abrasives are compounds that are harder than the materials they shape, smooth, polish or remove.

U.S. Pat. No. 6,057,257 to Morano, et al., teaches an abrasive composed of EAFD, glass, and silica sand. U.S. Pat. No. 5,964,911 to Morano, et al., teaches a process for making an abrasive composition by melting a mixture of EAFD, glass, and silica sand. These patents teach adding glass compositions, crushed glass, or cullet. The disclosures of each of these patents is hereby incorporated by reference into this specification.

There is a strong need for a safe, economical way to prevent the heavy metal contaminants in Coal Ash and EAFD from leaching into the environment, while at the same time creating useful commercial products. There is a need for abrasives and other glass ceramic products that perform well but are reasonably priced. No products currently on the market derive from a combination of Coal Ash and EAFD. It is an object of this invention to recycle Coal Ash and EAFD to create a feedstock for the manufacture of useful commercial products, such as economical abrasives and other glass ceramic products. It is an object of this invention to create a crude feedstock made from Coal Ash and EAFD which is environmentally safe. It is another object of this invention to produce a effective abrasives and other glass ceramic compositions with controlled hardness and fracture toughness properties that are inexpensive to produce and that outperform other products currently in the market. It is an object of the invention to use Coal Ash that was previously destined for landfills, as a readily available, high volume, cheap source of iron, alumina and silica to produce abrasives and other glass-ceramic products.

SUMMARY OF THE INVENTION

The present invention is a process for converting Coal Ash and EAFD into selected feedstocks used for a variety of purposes. The feedstocks are formed by preparing a mixture of Coal Ash, EAFD, cullet and an additive to form a blend. In an embodiment, the blend comprises about 90% to about 30% Coal Ash, about 50% to about 0% EAFD, about 30% to about 10% of cullet and a trace of additive. In an embodiment, the blend comprises about 95% to about 30% Coal Ash, about 50% to about 0% EAFD, about 40% to about 5% of cullet and about 15% to about 0% of additive. Additive include crystallization catalysts and similar compound to improves the fracture, friability and toughness of the feedstock. Additives include titanium dioxide, silicon dioxide, zirconium dioxide, potassium oxide, chromite sand, and the like.

The blend is melted at a controlled temperature and time to create the feedstock. In an embodiment, the blend is melted at a controlled temperature of from about 1500° F. to about 3000° F. for about 4-6 hours.

The resulting feedstocks are processed to create a useful products, including but not limited to fracking compounds, proppants, packing materials, sandpapers, grinding products, abrasives, lubricants, construction products, insulation materials, building materials (such as wallboard, roofing material, tile, countertops, ceramic fixtures, etc.), household goods (ceramics, artwork, etc.), fillers, fibers, beads, non-woven products, water jet cutting systems, non-skid surface materials, landscaping materials and the like. In an embodiment, the feedstock is quenched to create a fractured product and ground to a predetermined mesh size to produce an abrasive. In an embodiment, the feedstock is air dried in a mold. In an embodiment, the feedstock is processed into an aggregate used for rip rap, road and rail bed, ballast and other products.

The present invention is a beneficial use of the various constituents when combined with other metals to form spinels and metasilicates that do not leach when exposed to the environment. Spinels are a group of oxides with two metals and a structure similar to that of a diamond, having a relatively high hardness and high density. (AB2O4; where A is a divalent metal ion such as magnesium, iron, nickel, manganese and/or zinc). Metasilicates are solids in which SiO4 tetrahedra are condensed into chains or rings built up of SiO3—anions.

The present invention provides a unique mixing of Coal Ash and EAFD and other additives (to control the chemistry) to produce a high performing glass-ceramic products.

As used herein, "approximately" means within plus or minus 25% of the term it qualifies. The term "about" means between ½ and 2 times the term it qualifies.

As used herein, "coal ash" means any solid materials or residues (such as fly ash, bottom ash, or boiler slag) produced primarily from the combustion of coal. Coal Ash includes coal combustion products (CCPs) and coal combustion residue (CCRs).

As used herein, "bottom ash" means the more coarse (0.2-10 millimeters) remnants of burned coal that are not carried by draft or waste gases and accumulate in the bottom part of the furnace.

As used herein, "fly ash" means the fine solid particles of ash (5-50 μm) that are carried by draft or waste gases that are trapped in filters, flues and the like.

As used herein, "cullet" means glass that has been broken down or crushed into small pieces. The glass may be from product containers, such as beverage and food bottles and containers and/or waste glass that is left over in the production of glass containers and items.

The compositions and methods of the present invention can comprise, consist of, or consist essentially of the essential elements and limitations of the invention described herein, as well as any additional or optional components or limitations described herein or otherwise useful in systems and methods of the general type as described herein.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

DRAWING FIGURES

DETAILED DESCRIPTION OF THE INVENTION

The present invention addresses the processing of Coal Ash and EAFD to produce useful materials in reliable purities and compositions, at acceptable cost, without producing hazardous or toxic materials. The invention is unique in that it uses Coal Ash as a source of iron, alumina, other metals and silica to enhance an existing known process using EAFD to produce abrasives. In addition, the present invention is useful for and other glass-ceramic products and applications. In particular, the invention comprises a process that combines Coal Ash and EAFD with cullet and other additives to produce a feedstock for use in creating a variety of commercially useful glass-ceramic materials, such as but not limited to fracking compounds, proppants, packing materials, sandpaper, grinding materials, abrasives, construction and building materials, insulation, household goods, fillers, fibers, beads, non-woven products, water jet cutting systems, non-skid surface materials, landscaping materials and the like.

The process of the present invention is directed to producing one or more glass-ceramic products from a feedstock. The feedstock is made from a melted and cooled blend of Coal Ash, EAFD cullet and other additives.

Figure 1:
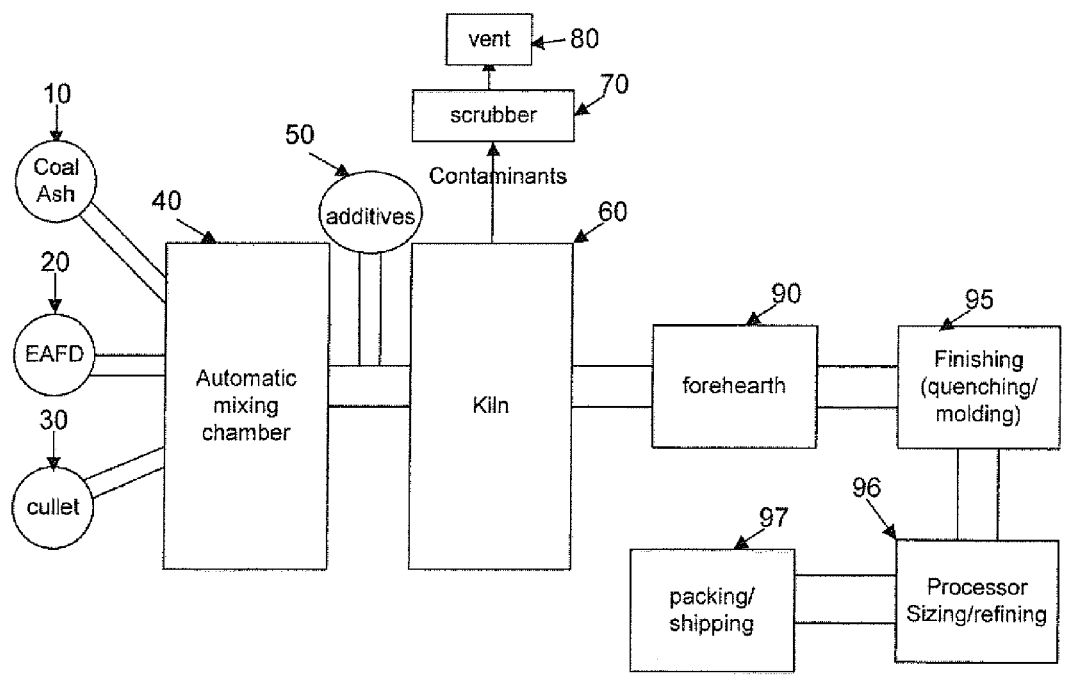
FIG. 1 is a diagram of components for performing the process of the present invention.

As shown in FIG. 1, an amount of Coal Ash 10 either wet or dry, is mixed with an amount of EAFD 20, and cullet 30 in a batch house or automatic mixer 40.

Any Coal Ash, such as fly ash, bottom ash and boiler slag, and the like can be utilized in the mix. In an embodiment, bottom ash and/or slag is used in combination with EAFD. The use of EAFD (which cab be as a source of iron) provides a more dense and economical end product, especially suited for abrasives. In an embodiment, the Coal Ash and EAFD are of a selected particle size. In an embodiment, Coal Ash and EAFD are procured at the preferred particle size. In an embodiment, Coal Ash and EAFD are ground and pre-screened to provide the desired particle size.

Various additives 50 are added to the blend to meet given specifications for a certain feedstock. Silica, alumina, other metals and or sodium are added to control the levels of the main ingredients and to control the melt point. Sources of silica, alumina, other metals and or sodium include waste streams, such as but not limited to contaminated soil, sludge, surface water, and ground water, that may contain contaminants such as heavy metals, organics and their byproducts.

Other additives are added to promote the formation of crystallization. Crystallization promoters include but are not limited to titanium dioxide, silicon dioxide, zirconium dioxide, potassium oxide, chromium, chromite sand and similar trace additives that improve fracture, friability and toughness by their impact on crystalline properties, type and relationships. In an embodiment, product and recycled fines and recycled abrasives are added to the blend. Recycled abrasives include but are not limited to aluminum oxide, garnet, ceramic (aluminum zirconia) and silicon carbide. In an embodiment, recycled abrasives are used as a crystallization catalyst and or product enhancer. In an embodiment, recycled abrasives are used for up to 40% of the silica or other minerals included in the feedstock. In an embodiment, the additive is a crystalline catalyst. In an embodiment, the additives are added to the mixing chamber. In an embodiment, the additives are added to the mixture prior to introduction to the kiln.

Particle sizes of the various materials are in a range for optimum mixing. Mesh size ranges from about 400 mesh to about ½ inch. In an embodiment, the particle size is about 100 to about 300 mesh. Moisture is controlled for proper mixing. A water or liquid spray may be used for dust control.

When the blend is thoroughly mixed, it is fed to a continuous float glass type kiln 60 that is temperature, level and pressure controlled. Feed rate and tap out rate are measured and controlled to control residence time. Viscosity is a measure of completion and uniformity of reaction. The blend is fed to the kiln in any manner that controls the feed rate. In an embodiment, the blend is fed to the kiln in an auger. In an embodiment, the blend is fed to the kiln on a belt feeder. In an embodiment, the blend is fed to the kiln in a push feeder. A continuous melt process, as compared to batch, recovery or extruding processes, provides cost effective heat transfer means and high throughput capabilities.

The purpose of the kiln is to provide energy to melt and chemically change the blend. The blend resides in the kiln for about 4 to about 8 hours. In an embodiment, the resident time is about 6 hours. In an embodiment, the kiln temperature is from about 1500 to about 3000 degrees Fahrenheit. In an embodiment, the temperature of the kiln ranges from about 2400 to about 2600 degrees Fahrenheit. Vitrification chemically binds the hazardous materials contained in EAFD in the silicate matrix.

The kiln interior is maintained at about at least 5% excess oxygen to maintain the formation of the silicate oxides and prevent the reduction of the metals. The level of the kiln is controlled to about 2 inches to about 12 inches. The pressure of the kiln is balanced at a normal or just slightly negative pressure.

Lights in the melt, such as chlorine, bromine, florine, sulfur and the like that act as contaminants, are removed through an exhaust system 70 including a vent 80. Any free carbon present in the blend (usually measured as LOI or Loss of Ignition) is reacted in the kiln.

The properties of the feedstock are determined by the amounts of Coal Ash, EAFD, cullet and other additives in the blend, as well as processing elements, such as temperature, residence time, atmosphere and the like. After a melt formula meets the properties requirements for a specific feedstock, the melt is tapped out through a heated forehearth 90 on a continuous basis. The molten material flowing from the kiln has a uniform viscosity. The molten material flows from the kiln to a section 95 where it is cooled. In an embodiment, cooling is by quenching in a controlled fashion with air, steam, water or a combination thereof. Controlling the quenching and heat history produces optimum crystallization and amorphous properties in the final product. In an embodiment, the melt is poured into a mold, and cooled. The quenched material then becomes a crude feedstock that is processed at a processor 96, such as being dried, annealed, crushed screen. In an embodiment, the feedstock is annealed at about 600° F. to about 900° F. The feedstock is then processed for use in the glass-ceramic/abrasives industry, and then shipped to consumers 97.

Figure 2:
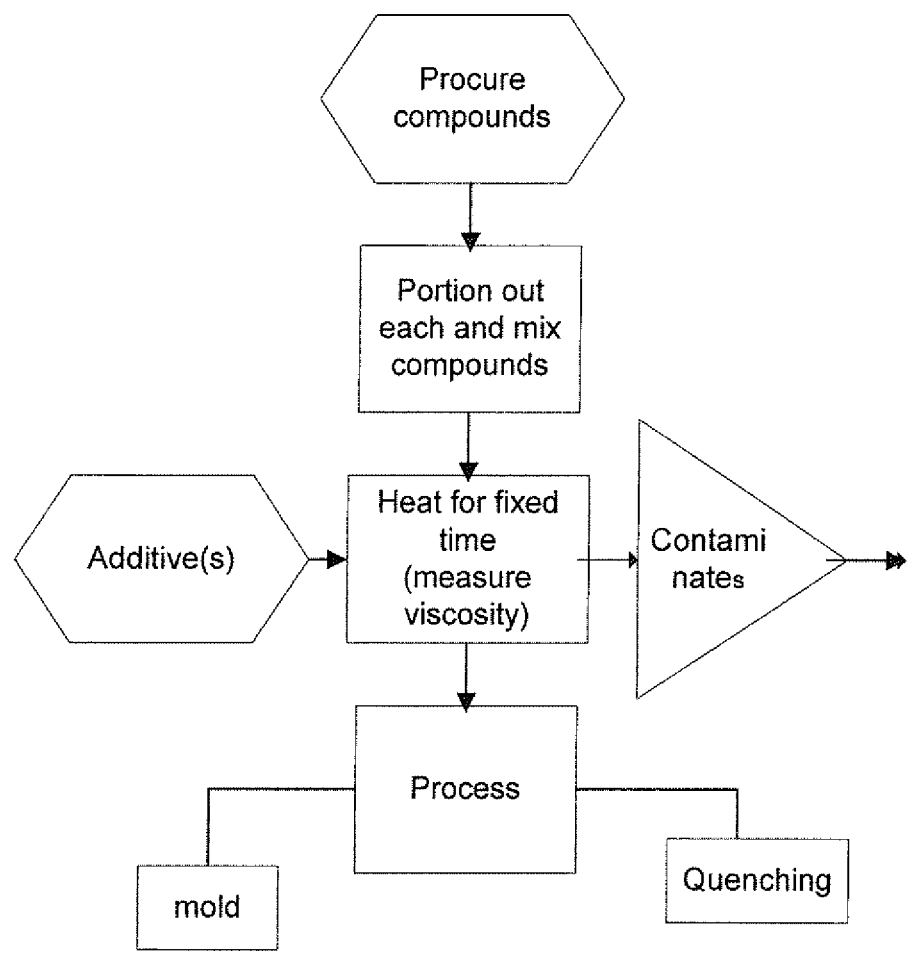
FIG. 2 is flow-chart of an overall process according to the present invention.

In an embodiment depicted in FIG. 2, the process starts with obtaining Coal Ash, EAFD, and cullet, which are maintained in receiving tanks. The amount of each component used in the process is determine by the feedstock to be produced. The given amount of each is measured and mixed and fed to a kiln. Additives, such as compounds to control the level of melt and the melt point and/or a crystalline catalyst are added. The kiln is maintained at given temperature, pressure and atmosphere for the desired feedstock. At a given viscosity, the melt is moved to the forehearth and then processed. The melt may be poured into molds, air dried or quenched.

Figure 3:
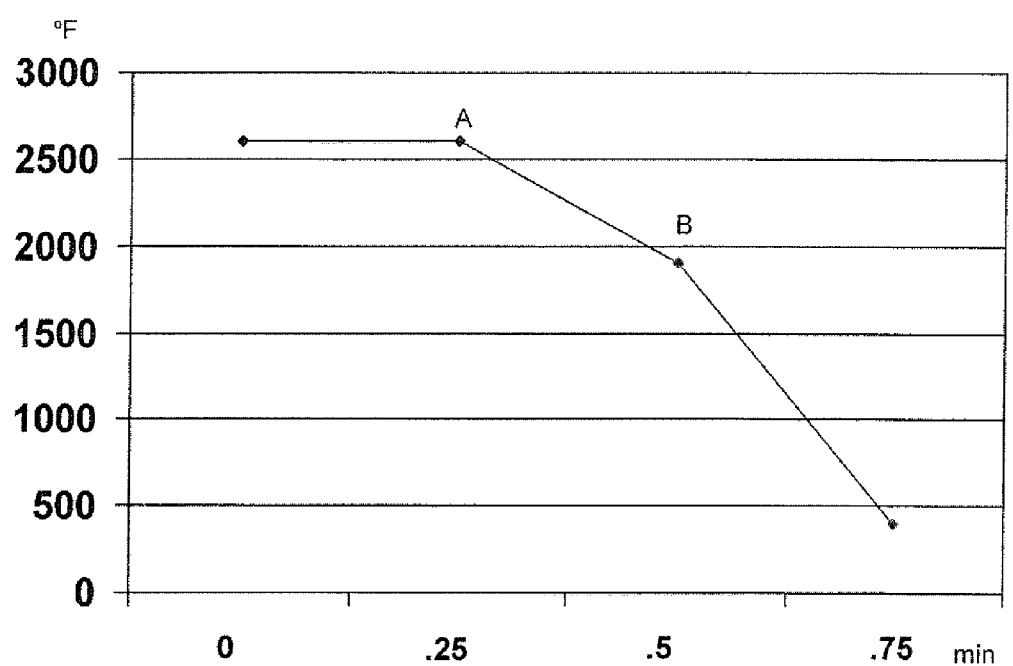
FIG. 3 is a chart showing temperatures vs. time at quenching for an embodiment of the invention.

A unique feature of an embodiment of the invention is the quenching step. The invention includes methods of quenching, such as but not limited to shrouds, water, steam, cooled rolls and the like. The invention further controls heat at critical points in the process to improve the resultant crystal, size, concentration and type of product. As shown in FIG. 3, thermally reforming and quenching (at A) promotes the growth of spinels (at B) to produce a product having a unique crystal and amorphous mix that provides for optimum abrasive qualities. In an embodiment, the melt is quickly quenched such that the product fractures into small pieces.

In an embodiment, the resulting product is ground using conventional means. In an embodiment, a grinder reduces the size of the product and the product is screened to a determined mesh size. In an embodiment, the mesh size is from about 30 to about 40; from about 40 to about 60; from about 60 to about 80; and from about 80 to about 100. The product is bagged or shipped in bulk.

Properties of the crude feedstock are controlled to optimize the performance of the product. These properties include:
Chemical composition (such as controlling Fe Al Si to make the product and process more uniform)
Crystal type, size and frequency
Bulk density
Hardness, friability and toughness In an embodiment, the crude feedstock is exposed to post heat treatment to improve the crystalline-amorphous nature of the product to improve its properties.

The crude feedstock is sized and screened to control:
Bulk density
Size distribution
Shape Performance of the finished product is then measured by:
Speed of cleaning
Resultant profiles
Cycles or reuses
Profile produced on the target
Dusting
Contamination
Operating Costs
Disposal Costs The present invention transforms hazardous and solid wastes into unique amorphous—crystalline products that are non-hazardous and useful.

Feedstocks made from the process of the invention are useful as fracking compounds, proppants, packing materials, sandpaper products, grinding materials, abrasives, construction and building materials, insulation, household goods, jewelry, fillers, fibers, beads, non-woven products, water jet cutting systems, lubricants, non-skid surface materials, landscaping materials and the like.

In an embodiment, the present invention provides a process for producing abrasive particles from blends of Coal Ash and EAFD with other materials. The blend is thermally reformed in a kiln to produce a crude feedstock that is quenched in a controlled fashion to produce particles for use in loose grain abrasives and water jet cutting. A particular advantage of the present invention is that the abrasive formed from the process is itself recyclable by re-melting in the process of the present invention. This is particularly important in abrasives used to remove paint (that may include lead) from objects. Other uses for a feedstock for abrasives include sandpaper, non-woven products, sanding discs and belts, polishing agents and the like.

In an embodiment, the feedstock is formulated to produce a correctly sized high-strength ceramic particle used to fracture rock and fill cracks as a packing material in wellbore drilling. The feedstock processed into a fracking compound comprises the necessary conductivity, permeability, grain size and crush resistance for superior fracturing and packing results.

Feedstocks are used for building materials, such as countertops, sinks, flooring, insulation, artwork, etc.; concrete; paving; construction aggregate (drainage, highway fill, landfill cover, base course, etc.); water filters, and the like. In an embodiment, a feedstock is used to create rounded particles similar to sand to be used for coastal beach fill, especially in areas of erosion or spoilage. In an embodiment, a feedstock produces landscape materials or beads that can be used in reflective paints for highways and signs, as well as other uses.

In an embodiment, the melt is discharged into a mold and cooled. The molded product may be further processed, such a by polishing, cutting, joining and the like. Molded products include any product in the glass-ceramic industry, including construction and building materials, landscaping, household items, jewelry, and the like.

The following examples are intended only to illustrate the invention and should not be construed as imposing limitations upon the claims.

EXAMPLE 1

About 30% by weight of EAFD is mixed with about 48% Coal Ash, about 18% cullet and about 4% additive. In this example, the additive is titanium dioxide. After the mixture is well blended, it is fed to a natural gas fired kiln having a temperature of about 2400° F. for about 6 hours. During residence, the blend melts and light metals in the melt are removed through a scrubber and vented out of the system. The melt is the melt is tapped out through a heated forehearth and immediately quenched in a room temperature water bath that fractures the melt. The cooled product is ground, screened and packed for shipping for use as a loose grain abrasive.

The foregoing description of the invention has been presented for purposes of illustration and description. It is not intended to be exhaustive nor to limit the invention to the precise form disclosed. Many alternatives, modifications, and variations will be apparent to those skilled in the art. Likewise, the invention is not limited to existing technologies. Accordingly, this invention is intended to embrace all alternatives, modifications, and variations that fall within the spirit and broad scope of the claims.

We claim:

1. A process for converting Coal Ash and EAFD into a feedstock comprising:
   a. preparing a mixture of Coal Ash and EAFD;
   b. adding cullet and an additive to form a blend;
   c. melting the blend at a controlled temperature and time in an oxidizing atmosphere to create the feedstock, the feedstock comprising at least one spinel or metasilicate;
   d. processing the feedstock by grinding or crushing.

2. The process of claim 1 wherein the blend comprises about 90% to about 30% Coal Ash, up to about 50% EAFD, about 30% to about 10% of cullet and a trace of additive.

3. The process of claim 1 wherein the blend comprises about 95% to about 30% Coal Ash, up to about 50% EAFD, about 40% to about 5% of cullet and up to about 15% of additive.

4. The process of claim 1 wherein the additive is a crystallization catalyst that improves at least one of fracture, friability and toughness of the feedstock.

5. The process of claim 4 wherein the crystallization catalyst is a recycled abrasive.

6. The process of claim 1 wherein the additive is at least one of titanium dioxide, silicon dioxide, zirconium dioxide, potassium oxide and chromite sand.

7. The process of claim 1 wherein the additive is at least one of a silica, a metal and sodium.

8. The process of claim 7 wherein the at least one of a silica, metal and sodium is sourced from a waste stream.

9. The process of claim 8 wherein the waste stream is one of a contaminated soil, a sludge, a surface water, and a ground water.

10. The process of claim 1 wherein up to about 40% of the additive is a recycled abrasive.

11. The process of claim 1 wherein the blend is melted at a controlled temperature of from about 1500° F. to about 3000° F. for about 4 hours to about 8 hours.

12. The process of claim 1 wherein the melting takes place in a kiln with an atmosphere of about at least 5% excess oxygen.

13. The process of claim 1 wherein the processing comprises quenching the feedstock to create a fractured product prior to grinding the feedstock to produce an abrasive.

14. The process of claim 1 wherein the processing comprises air drying the feedstock in a mold prior to grinding or crushing.

15. The process of claim 1 wherein the feedstock is processed into an aggregate.

16. The process of claim 15 wherein the aggregate is used for one of a rip rap, a road bed, a rail bed, and a ballast.

17. The process of claim 1 wherein the ground or crushed feedstock is used to produce a product selected from the group consisting of a fracking compound, a proppant, a packing material, a sandpaper product, a grinding wheel, an abrasive, a lubricant, a construction product, an insulation material, a building material, a household good, a filler, a fiber, a bead, a non-woven product, a water jet cutting system, a non-skid surface material, an aggregate and a landscaping material.

18. The process of claim 16 wherein the building material is selected from the group consisting of: a wallboard, roofing material, countertops, and ceramic fixtures.

19. A product produced by the process of claim 1.

20. The product of claim 19 wherein the product is selected from the group consisting of a fracking compound, a proppant, a packing material, a sandpaper product, a grinding wheel, an abrasive, a construction product, an insulation material, a building material, a household good, a filler, a fiber, a bead, a non-woven product, a water jet cutting system, a non-skid surface material, an aggregate and a landscaping material.

21. The product of claim 19 wherein the product is ground into a rounded particle.

22. A process for converting Coal Ash and EAFD into a product comprising:
   a. preparing a mixture of about 30% by weight of EAFD, the EAFD containing at least iron with about 48% Coal Ash, the Coal Ash containing at least silica and alumina;
   b. adding about 18% cullet and about 4% titanium dioxide to the mixture to form a blend;
   c. melting the blend at a temperature from about 2400 degrees Fahrenheit to about 2600 degrees Fahrenheit in a continuous float glass type kiln for about 4 hours to about 8 hours in an oxidizing atmosphere to chemically bind at least one hazardous material contained in the EAFD in a silicate matrix in the feedstock, the feedstock comprising at least one spinel or metasilicate; and
   d. processing the feedstock by grinding or crushing.

* * * * *